Feb. 14, 1939.                W. SCHNEIDER                 2,147,112
                    ANTIHALATION LAYER AND FILTER LAYER
                            Filed Aug. 18, 1934

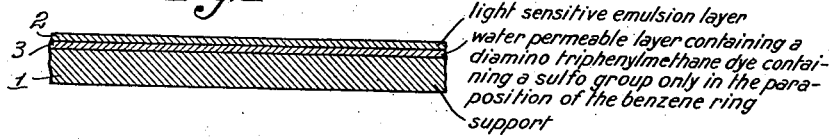

Fig. 1
- light sensitive emulsion layer
- water permeable layer containing a diamino triphenylmethane dye containing a sulfo group only in the para-position of the benzene ring
- support

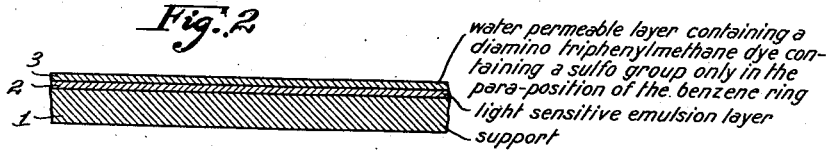

Fig. 2
- water permeable layer containing a diamino triphenylmethane dye containing a sulfo group only in the para-position of the benzene ring
- light sensitive emulsion layer
- support

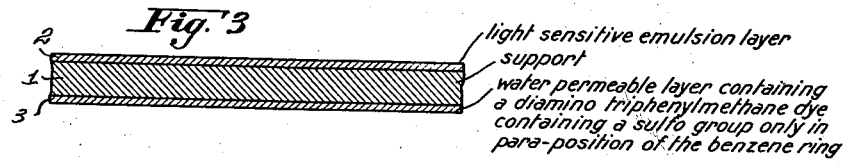

Fig. 3
- light sensitive emulsion layer
- support
- water permeable layer containing a diamino triphenylmethane dye containing a sulfo group only in para-position of the benzene ring

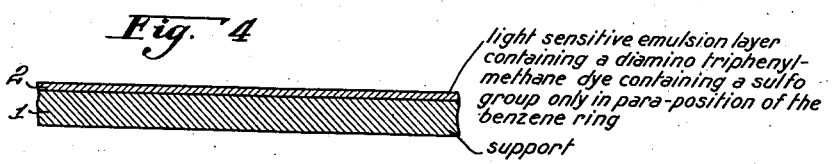

Fig. 4
- light sensitive emulsion layer containing a diamino triphenylmethane dye containing a sulfo group only in para-position of the benzene ring
- support Inventor:
Wilhelm Schneider,
By   Attorneys
Potter, Pierce & Scheffler.

Patented Feb. 14, 1939

2,147,112

UNITED STATES PATENT OFFICE 2,147,112

ANTIHALATION LAYER AND FILTER LAYER

Wilhelm Schneider, Dessau in Anhalt, Germany, assignor to Agfa Ansco Corporation, Binghamton, N. Y., a corporation of New York Application August 18, 1934, Serial No. 740,535
In Germany August 19, 1933

6 Claims. (Cl. 95—8)

My present invention relates to the manufacture of anti-halation layers or filter layers.

One of its objects are the improved anti-halation layers and filter layers. Further objects will be seen from the detailed specification following hereafter.

In the manufacture of anti-halation layers and filter layers for photographic purposes, certain green dyestuffs of the triphenyl-methane series are used, but the layers made therewith are not completely bleached during the developing process; there generally remains a more or less strong coloration, or the coloration reappears, or is strengthened, during the subsequent drying. It has also been found that various representatives of this series of dyes, for example, malachite green, have a strong desensitizing action on photographic emulsions. This drawback is less in evidence with the commercial sulfurized dyestuffs, but these also exhibit the disadvantage of incomplete decolorization.

According to this invention I have found it possible to select a class of green dyes of the triphenylmethane series which are not subject to the aforesaid drawbacks and permit the unobjectionable manufacture of water permeable antihalation layers and filter layers. This class comprises the diamino-triphenylmethane dye having a sulfo-group only in the para-position of the benzene ring which does not contain an amino group.

Such a dyestuff may be regarded as of the general formula

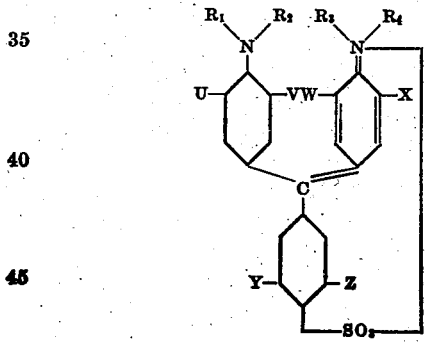

in which $R_1$, $R_2$, $R_3$ and $R_4$ are the usual aliphatic or cyclic radicals, which may or may not contain substituent but contain no sulfo-group and U, V, W, X, Y and Z may be hydrogen or substituents usual in the chemistry of organic dyestuffs. For instance, the following dyes are suitable for the purpose of the invention.

(1) The dye corresponding with the formula

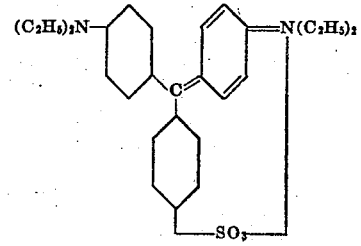

is produced by heating 30 grams of diethylaniline, 22 grams of p-benzaldehyde sodium sulfonate and 25 cc. of concentrated hydrochloric acid for 24 hours to 100° C. while stirring. The reaction mixture is made alkaline and the excess of diethylaniline is removed by distillation with steam. The leuco compound is separated by addition of salt and purified by dissolving it in water and separating it again by the addition of salt. Then the leuco compound is oxidized with the calculated quantity of lead dioxide at 0° C. The dye is precipitated by the addition of sodium sulfate and is recrystallized from alcohol.

(2) The dye corresponding with the formula

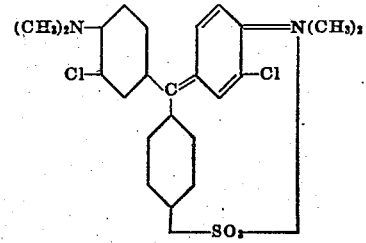

is produced by condensing and oxidizing in the above manner a mixture of 32 grams of o-chlorodimethylaniline, 22 grams of p-benzaldehyde sodium sulfonate and 25 cc. of concentrated hydrochloric acid. The dye is separated by the addition of common salt and purified by dissolution in water and reprecipitation with common salt.

(3) The dye

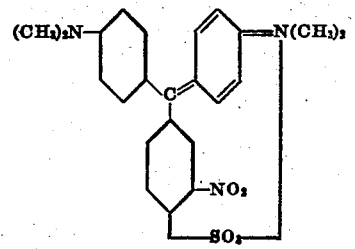

the preparation of which is described in Annalen der Chemie, 294, page 383.

(4) The dye Helvetia green corresponding with the formula

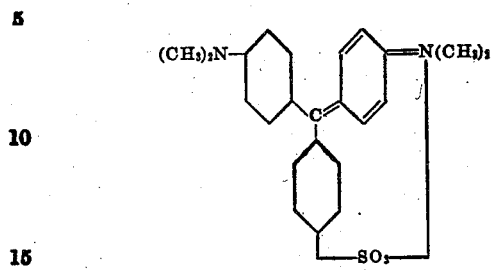

see Schultz, Farbstofftabellen 2nd edition, page 266.

The anti-halation and filter layers are cast from a solution of the dye and a binding agent. As a binding agent there are suitable colloids such as gelatin, casein, ammonium polyglucuronate, mucilages, vegetable gums, and artificial resins, particularly those which are alkali soluble and contain a hydroxy group or a carboxyl group. The dye is added to the solution of the binding agent or vice versa in the required amount which is only limited by the solubility of the dye in the particular solvent.

The following examples illustrate the invention.

Example 1.—10 grams of gelatin are dissolved in 100 cc. of water. To this solution there are added 0.1 gram of the above dye (1). This solution is cast on plates or films to form an anti-halation layer or a filter layer.

Example 2.—To a solution of 1 gram of the above dye (4) in 100 cc. of alcohol there are added 10 grams of a phenoxyacetic acid-formaldehyde resin. The solution is cast on the back of a film or plate to form an anti-halation layer.

The accompanying drawing illustrates my invention.

In Fig. 1 the support 1 is provided with an anti-halation layer 3 containing a water permeable binding agent and a diamino triphenylmethane dye containing a sulfo group only in the para-position of the benzene ring which does not contain an amino group. The light-sensitive emulsion layer 2 is attached to the anti-halation layer 3. Fig. 2 shows a film in which the support 1 is coated with a light-sensitive emulsion layer 2, and on the latter there is provided a water permeable filter layer 3 containing a diamino triphenylmethane dye containing a sulfo group only in the para-position of the benzene ring. Fig. 3 shows a film of which the support 1 bears on one side the light-sensitive emulsion layer 2 and on the other side the water permeable anti-halation layer 3 containing a diamino triphenylmethane dye containing a sulfo group only in the para-position of the benzene ring. In Fig. 4 the support 1 of a film or plate is provided with the light-sensitive emulsion layer 2 containing as a filter dye a diamino triphenylmethane dye containing a sulfo group only in the para-position of the benzene ring.

What I claim is:

1. A photographic emulsion support provided with a water permeable layer containing a diaminotriphenylmethane dye containing a sulfo group only in the para-position of the benzene ring.

2. A photographic emulsion support provided with a water permeable layer containing a dye corresponding with the formula

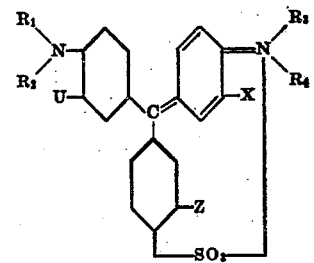

in which $R_1$, $R_2$, $R_3$ and $R_4$ represent alkyl, U and X each represents a member selected from the group consisting of H and halogen, and Z represents a member of the group consisting of H and $-NO_2$.

3. A photographic emulsion support provided with a water permeable layer containing a dye corresponding with the formula

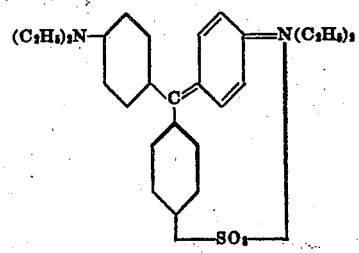

4. A photographic emulsion support provided with a water permeable layer containing a dye corresponding with the formula

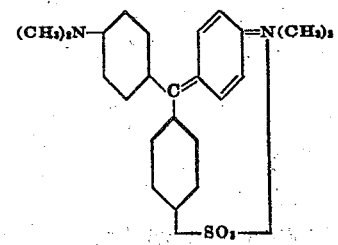

5. A photographic emulsion support provided with a water permeable layer comprising gelatin and a dye corresponding with the formula

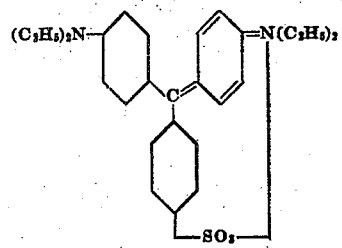

6. A photographic emulsion support provided with a water permeable layer comprising phenoxyacetic acid-formaldehyde resin and a dye corresponding with the formula

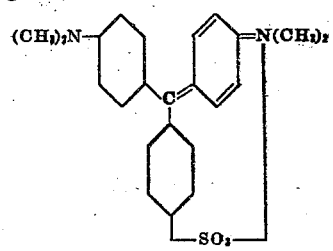

WILHELM SCHNEIDER.